United States Patent [19]
Masuda

[11] Patent Number: 6,075,638
[45] Date of Patent: Jun. 13, 2000

[54] SCANNING AND IMAGING LENS AND OPTICAL SCANNING DEVICE

[75] Inventor: Kouji Masuda, Yokohama, Japan

[73] Assignee: Ricoh Company, Ltd., Tokyo, Japan

[21] Appl. No.: 08/785,274

[22] Filed: Jan. 21, 1997

[30] Foreign Application Priority Data

Jan. 22, 1996 [JP] Japan .................................. 8-008357
Aug. 23, 1996 [JP] Japan .................................. 8-222279

[51] Int. Cl.$^7$ ................................................ G02B 26/08
[52] U.S. Cl. .................... 359/206; 359/207; 359/662; 347/258
[58] Field of Search .................... 359/205, 206, 359/207, 662; 347/244, 258, 259

[56] References Cited

U.S. PATENT DOCUMENTS 5,329,399  7/1994  Ho ........................................... 359/206
5,600,475  2/1997  Mochizuki et al. ..................... 359/205

FOREIGN PATENT DOCUMENTS 7-35996  2/1995  Japan .
7-69521  7/1995  Japan .

*Primary Examiner*—Darren E. Schuberg
*Attorney, Agent, or Firm*—Oblon, Spivak, McClelland, Maier & Neustadt, P.C.

[57] ABSTRACT

An optical scanning lens is for use in an optical scanning device in which a light beam forming a line image elongated in a direction corresponding to a main-scanning direction is deflected at a constant angular velocity by a deflector having a reflecting surface in a vicinity of a position of the line image, and in which a deflected beam is focused by the optical scanning lens to form a beam spot on a surface to be scanned so that a constant velocity optical scanning of the surface to be scanned is effected, the optical scanning lens having a single-lens construction and being constructed such that at least one of lens surfaces has an asymmetrical configuration with respect to an optical axis within a plane of deflection, the asymmetrical configuration with respect to the optical axis being designed so that a field curvature is properly corrected and a proper constant-velocity characteristic is obtained over an entire effective optical scanning area, and the plane of deflection being defined as a plane including the optical scanning lens and parallel to the direction corresponding to the main-scanning direction.

8 Claims, 6 Drawing Sheets

FIELD CURVATURE

CONSTANT-VELOCITY CHARACTERISTIC/ LINEARITY

FIELD CURVATURE

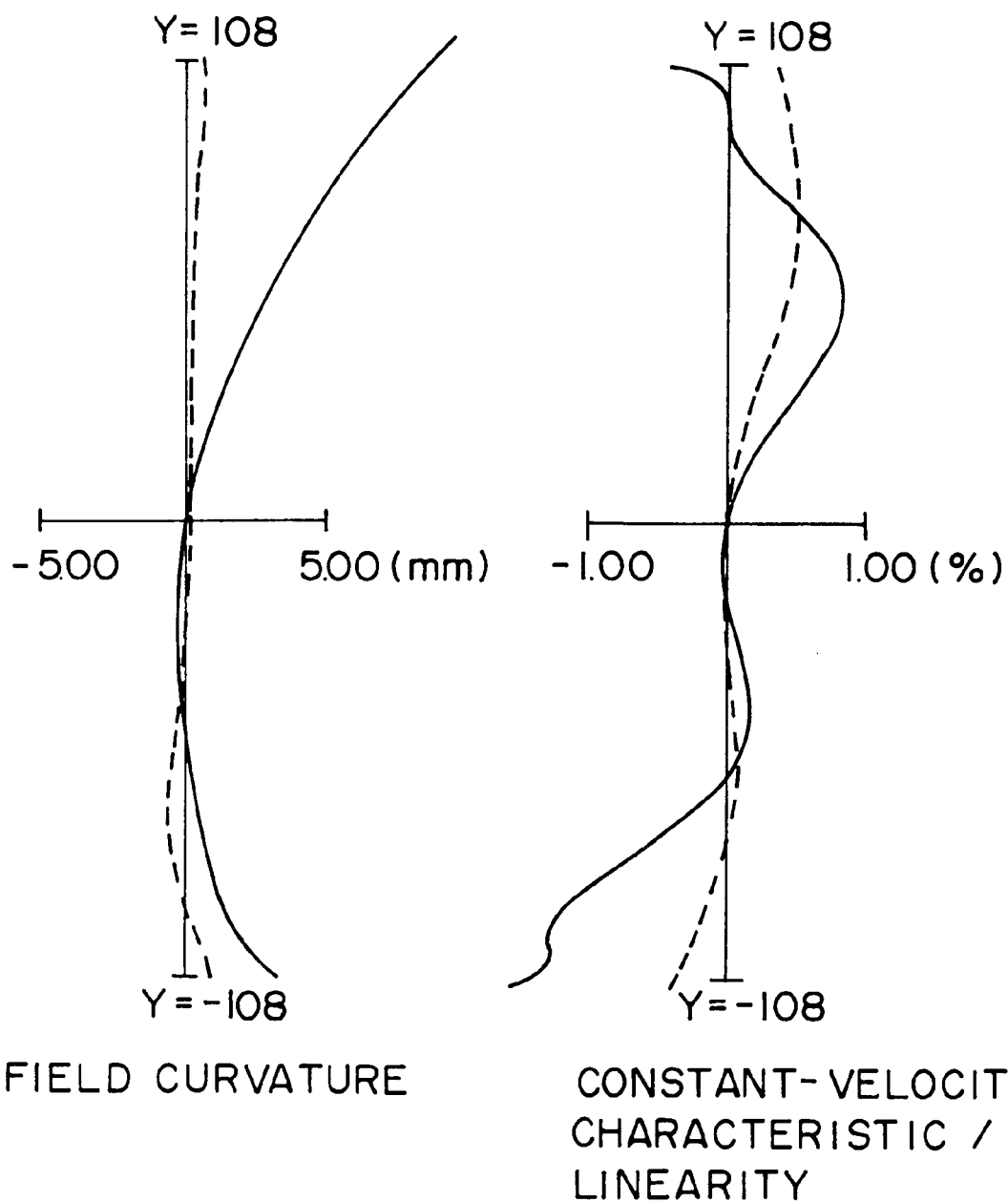

FIELD CURVATURE

CONSTANT-VELOCITY CHARACTERISTIC / LINEARITY

FIELD CURVATURE

CONSTANT-VELOCITY
CHARACTERISTIC /
LINEARITY

SCANNING AND IMAGING LENS AND OPTICAL SCANNING DEVICE

BACKGROUND OF THE INVENTION

1. Field of the Invention

The present invention relates to a scanning and imaging lens and an optical scanning device.

2. Description of the Related Art

A scanning and imaging lens for use in an optical scanning device is required to have a proper fΘ characteristic in order to ensure a constant velocity in optical scanning. Further, the curvature of field of such a scanning and imaging lens must be corrected in order to reduce a variation in the diameter of a beam spot. In order to meet these requirements, the surface of the scanning and imaging lens needs to have a unique configuration (see Japanese Laid-Open Patent Application no. 7-35996).

Hereinafter, the term "direction corresponding to the main-scanning direction" is used to denote a direction, in an optical path between a light source and a scan surface, that corresponds to the main-scanning direction. The term "direction corresponding to the sub-scanning direction" is used to denote a direction, in an optical path between a light source and a scan surface, that corresponds to the sub-scanning direction.

A polygon mirror is normally used as a beam deflector for deflecting a light beam incident on a scanning and imaging lens. The center of rotation of a deflecting and reflecting surface of a polygon mirror is not located in the deflecting and reflecting surface. A beam may be focused so that a line image extended in a direction corresponding to the main-scanning direction is formed in the vicinity of the deflecting and reflecting surface, in order to correct a so-called facet inclination. In such a construction, a sag may occur. A sag is a variation of a relative position at which the line image is formed with respect to the deflecting and reflecting surface, the variation being asymmetrical with respect to an optical axis of the scanning and imaging lens and occurring in response to the rotation of the polygon mirror.

The surface of the conventional scanning and imaging lens is symmetrical with respect to the optical axis in the direction corresponding to the main scanning direction. Therefore, when a sag occurs, the curvature of field of and the constant-velocity characteristic of the lens is significantly degraded. Such a degradation in the performance is conventionally corrected by a shift of the scanning and imaging lens or a tilt thereof. However, such means of correction is far from satisfactory.

SUMMARY OF THE INVENTION

Accordingly, a general object of the present invention is to provide a scanning and imaging lens and an optical scanning device in which the aforementioned problems are eliminated.

Another and more specific object of the present invention is to correct an unfavorable effect of a sag and provide a satisfactory optical scanning in an optical scanning device in which a polygon mirror is used as a beam deflector, a scanning and imaging lens formed of one or more lenses is used, and a facet inclination is corrected.

The scanning and imaging lens according to the present invention is used in an optical scanning device in which a light beam forming a line image extended in a direction corresponding to the main-scanning direction is deflected at a constant angular velocity by a polygon mirror having a deflecting and reflecting surface in the vicinity of the image forming position of the line image, and in which the deflected beam is focused by a scanning and imaging lens to form a beam spot on a scan surface so that a constant velocity optical scanning of the scan surface is effected.

The scanning and imaging lens according to the invention as described in claim 1 has the following features.

The scanning and imaging lens according to claim 1 has a single-lens construction. At least one of the lens surfaces has an asymmetrical configuration with respect to the optical axis within a plane of deflection (defined below). Such an asymmetrical configuration with respect to the optical axis is designed so that the field curvature is properly corrected and a proper constant-velocity characteristic is obtained over the entire effective optical scanning area.

The plane of deflection is defined as a plane including the plane through which a deflected beam passes. In the absence of a shift or a tilt in the scanning and imaging lens, the plane swept by a primary ray of the beam deflected ideally by a beam deflector coincides with the plane of deflection.

According to claim 1, at least one of the two lens surfaces may be asymmetrical with respect to the optical axis within the plane of deflection. Alternatively, both surfaces of the scanning and imaging lens may have a nonarcuate configuration asymmetrical with respect to the optical axis within the plane of deflection (claim 2).

A nonarcuate configuration is a curve which is not an arc and is generally given by the following polynomial $$X=(Y^2/Rm)/[1+\sqrt{(1-(1+K)(Y/Rm)^2)}]+A \cdot Y^4+B \cdot Y^6+C \cdot Y^8+D \cdot Y^{10}+ \quad (1)$$

where Rm denotes a radius of curvature on the optical axis within the plane of deflection, Y denotes a distance from the optical axis in the direction corresponding to the main-scanning direction, K is a conical constant, A, B, C, D . . . are high-order coefficients, and X coordinates are lined up in the direction of the optical axis. That the configuration of the lens surfaces is asymmetrical with respect to the direction corresponding to the main scanning direction means that the equation (1) is differently constructed for one side of the optical axis from that of the other side.

The scanning and imaging lens as described in claim 1 or claim 2 may be modified such that the radius of curvature of at least one of the lens surfaces within the plane of deflection is denoted by a polynomial of high order $\Sigma a_n \cdot Y^{**}n$ (n=0, 1, 2, 3 . . . ), where Y denotes a distance from the optical axis in the direction corresponding to the main-scanning direction, and a configuration provided by this polynomial is asymmetrical with respect to the optical axis (claim 3).

By definition, a plane perpendicular to the plane of deflection is parallel to the optical axis of the scanning and imaging lens. In the polynomial of high order above, $Y^{**}n$ denotes an nth power of Y.

One of the lens surfaces may have a nonarcuate configuration asymmetrical with respect to the optical axis within the plane of deflection, and the other lens surface may be symmetrical with respect to the optical axis. The surface whose radius of curvature within the plane perpendicular to the plane of deflection is given by a polynomial asymmetrical with respect to Y may be combined with a nonarcuate configuration asymmetrical with respect to the optical axis within the plane of deflection. Alternatively, such a surface may be combined with a configuration symmetrical with respect to the optical axis.

Irrespective of whether only one of the lens surfaces is asymmetrical with respect to the optical axis within the plane of deflection or both the lens surfaces are asymmetrical with respect to the optical axis, the both surfaces may have a radius of curvature within the plane of deflection given by a polynomial asymmetrical with respect to Y.

The scanning and imaging lens as described in any of claims 1 through 3 may be formed by molding a plastic (claim 4).

For correction of a facet inclination of a polygon mirror, a general approach is to cause the image forming position of the line image and the deflecting and reflecting surface to approach each other so that the scanning and imaging lens provides a conjugated relationship between the position in the vicinity of the deflecting and reflecting surface and the scan surface in the direction corresponding to the sub-scanning direction. The deflecting and reflecting surface of the polygon mirror and the scan surface may be in a conjugated formation over the entire effective optical scanning area in the direction corresponding to the sub-scanning direction (claim 5). The image forming position of the line image and the scan surface may be in a conjugated formation over the entire optical scanning area in the direction corresponding to the sub-scanning direction (claim 6). The position at which a mirror image of the line image is formed due to the deflecting and reflecting surface varies in response to the rotation of the deflecting and reflecting surface. The invention as described in claim 6 specifically provides that the mirror image forming position and the scan surface remain in a conjugated formation in the direction corresponding to the sub-scanning direction at every moment.

The optical scanning device according to the present invention is constructed such that the beam focused to form a line image extended in the direction corresponding to the main-scanning direction is deflected at a constant angular velocity by a polygon mirror provided with a deflecting and reflecting surface in the vicinity of the image forming position of the line image. The deflected beam is focused by the scanning and imaging lens to form a beam spot on the scan surface so that the scan surface is subject to a constant-velocity optical scanning.

The optical scanning device as described in claim 7 is characterized in that the scanning and imaging lens as described any of claims 1 through 6 is used.

The scanning and imaging lens as described in claim 8 has the following features.

The scanning and imaging lens according to claim 8 is constructed of one or a plurality of lenses. At least one of the surfaces of one of the lenses has a configuration asymmetrical with respect to the optical axis within the plane of deflection. The asymmetrical configuration is designed such that the field curvature in the main-scanning direction is properly reduced and the constant-velocity characteristic is maintained over the entire effective optical scanning area.

At least one of the lenses may have both surfaces thereof formed to have a nonarcuate configuration asymmetrical with respect to optical axis (claim 9).

The scanning and imaging lens as described in claim 8 or claim 9 may be constructed such that at least one of the lenses constituting the scanning and imaging lens have at least one surface thereof formed to have a radius of curvature within the plane perpendicular to the plane of deflection which radius is given by a polynomial of high order $\Sigma a_n \cdot Y^{}n$ (n=0, 1, 2, 3, ...), where Y denotes a distance from the optical axis in the direction corresponding to the main-scanning direction, and a configuration provided by the polynomial is asymmetrical with respect to the optical axis (claim 10**).

The scanning and imaging lens as described in claim 10 may be constructed such that the surface having an asymmetrical radius of curvature with respect to the optical axis within the plane perpendicular to the plane of deflection is also asymmetrical with respect to the optical axis in the plane of deflection (claim 11).

The scanning and image forming lens as described in any of claims 8 through 11 having a configuration asymmetrical with respect to the optical axis within the plane of deflection may be formed by molding a plastic (claim 12).

The scanning and imaging lens as described in any of claims 8–12 may be constructed such that the deflecting and reflecting surface and the scan surface are in a conjugated formation in the direction corresponding to the sub-scanning direction over the entire effective optical scanning area (claim 13). Alternatively, it may be constructed such that the image forming position of the line image and the scan surface are in a conjugated formation in the direction corresponding to the sub-scanning direction over the entire effective optical scanning area (claim 14).

The optical scanning device as described in claim 15 is characterized in that the scanning and imaging lens as described in any of claims 8 through 14 is used.

Of course, an area in which a small field curvature results in the main-scanning direction and the proper constant-velocity characteristic is provided may be extended beyond the effective optical scanning area. An area in which the image forming position of the line image and the scan surface are in a conjugated formation in the direction corresponding to the sub-scanning direction may also be extended beyond the effective optical scanning area.

BRIEF DESCRIPTION OF THE DRAWINGS

Other objects and further features of the present invention will be apparent from the following detailed description when read in conjunction with the accompanying drawings, in which:

FIG. 5A is a graph showing a field curvature according to a related embodiment in a case where an effect caused by a sag is present;

FIG. 5B is a graph showing a constant-velocity characteristic and a linearity according to the related embodiment in a case where an effect caused by a sag is present;

DESCRIPTION OF THE PREFERRED EMBODIMENTS

Figure 1:
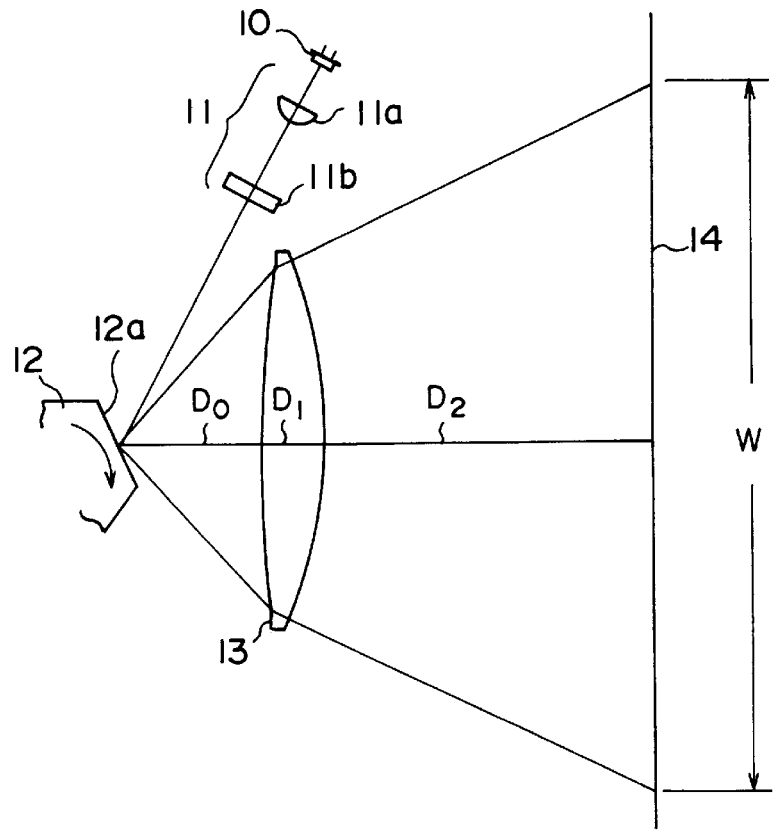
FIG. 1 illustrates an optical scanning device as described in claim 7.

FIG. 1 illustrates an optical scanning device as described in claim 7.

Referring to FIG. 1, a divergent beam radiated by a semiconductor laser 10 that serves as a light source is coupled by a coupling lens 11a and incident on a cylinder lens 11b. The cylinder lens 11b focuses the beam in the direction corresponding to the sub-scanning direction (a direction perpendicular to the plane of illustration) so that a line image extended in the direction corresponding to the main-scanning direction is formed in the vicinity of a deflecting and reflecting surface 12a of a polygon mirror 12. With respect to the direction corresponding to the main-scanning direction, a light beam exiting a first optical system 11 formed of the coupling lens 11a and the cylinder lens 11b may be a parallel beam, a slightly divergent beam or a slightly convergent beam.

As the polygon mirror 12 is rotated at a constant speed, the reflected beam reflected by the deflecting and reflecting surface 12a is deflected at a constant angular velocity. The deflected beam is then incident on the scanning and imaging lens 13 which causes the beam to be focused on a scan surface 14 to form a beam spot. The beam spot scans the scan surface 14 at a constant velocity.

Briefly reviewing, according to the optical scanning device shown in FIG. 1, the light beam exiting the semiconductor laser 10 is processed by the first optical system 11 so as to form a line image extended in the direction corresponding to the main-scanning direction. The polygon mirror 12 having the deflecting and reflecting surface 12a near the position at which the line image is formed deflects the beam at a constant angular velocity. The deflected beam is focused by the scanning and imaging lens 13 on the scan surface 13 so as to form a beam spot which scans the scan surface 14 at a constant velocity. Since a photosensitive body is placed at the scan surface, the beam spot generally subjects the surface of the photosensitive body to optical scanning.

Figure 7:
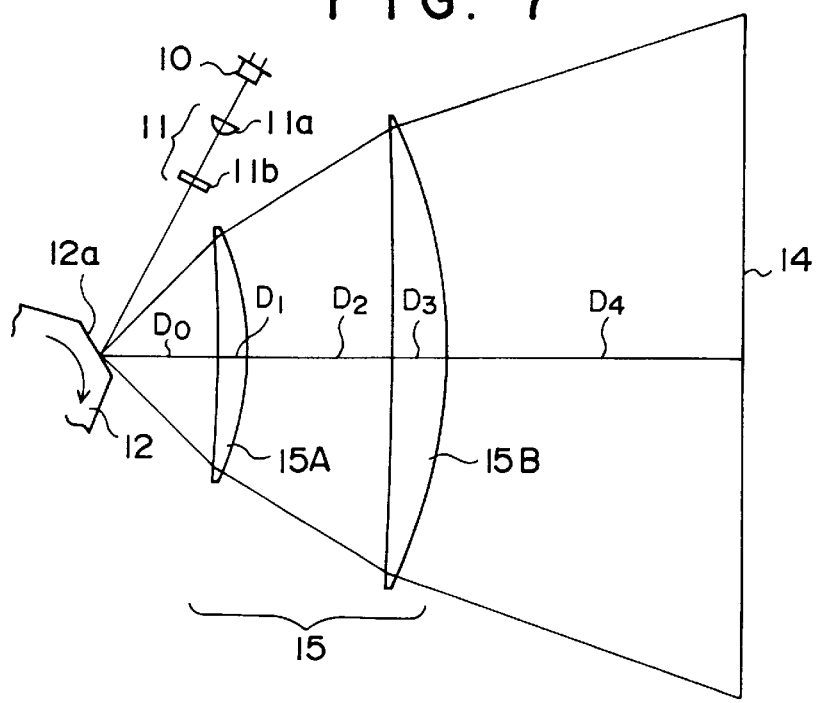
FIG. 7 illustrates an optical scanning device as described in claim 7.

FIG. 7 illustrates an optical scanning device as described in claim 15. For the sake of simplicity, those components that are generally the same as the corresponding components of FIG. 1 are designated by the same reference numerals.

A divergent beam radiated by the semiconductor laser 10 that serves as a light source is coupled by the coupling lens 11a and incident on the cylinder lens 11b. The cylinder lens 11b focuses the beam in the direction corresponding to the sub-scanning direction so that a line image extended in the direction corresponding to the main-scanning direction is formed in the vicinity of the deflecting and reflecting surface 12a of the polygon mirror 12.

With respect to the direction corresponding to the main-scanning direction, a light beam exiting the first optical system 11 formed of the coupling lens 11a and the cylinder lens 11b may be a parallel beam, a slightly divergent beam or a slightly convergent beam, as in the embodiment shown in FIG. 1.

As the polygon mirror 12 is rotated at a constant speed, the reflected beam reflected by the deflecting and reflecting surface 12a is deflected at a constant angular velocity. The deflected beam is then incident on a scanning and imaging lens 15 which causes the beam to be focused on the scan surface 14 to form a beam spot. The beam spot scans the scan surface 14 (more specifically, the photosensitive body) at a constant velocity. The scanning and imaging lens 15 is formed of two lenses 15A and 15B.

A description will now be given of three specific embodiments of the present invention.

In first and second embodiments, a scanning and imaging lens is formed of a single lens as shown in FIG. 1 so that the beam exiting the first optical system is slightly convergent with respect to the direction corresponding to the main-scanning direction. It is assumed that, in the absence of the scanning and imaging lens 13, the convergent beam is reflected by the deflecting and reflecting surface 12a and is focused in the direction corresponding to the main-scanning direction at a point (referred to as a natural focal point) on the optical axis of the scanning and imaging lens 13 which point is spaced apart from the deflecting and reflecting surface 12a by a distance S. The polygon mirror 12 has six deflecting and reflecting surfaces and the diameter of the inscribed circle of the deflecting and reflecting surface 12a is 18 mm.

Given an image height of the beam spot is 0 (that is, when the deflected beam coincides with the optical axis of the scanning and imaging lens), it is assumed that the distance between the deflecting and reflecting surface and the entrance surface of the scanning and imaging lens 13 is $D_0$, the distance between the surfaces of the scanning and imaging lens 13 on the optical axis thereof is $D_1$, and the distance between the exit surface of the scanning and imaging lens 13 and the scan surface 14 on the optical axis of the scanning and imaging lens 13 is $D_2$.

It is further assumed that the radius of curvature (the radius of curvature on the optical axis within the plane of deflection) of the entrance surface of the scanning and imaging lens 13 on the optical axis thereof is $R_1m$ with respect to the direction corresponding to the main-scanning direction and $R_1s$ with respect to the direction corresponding to the sub-scanning direction, and the radius of curvature of the exit surface of the scanning and imaging lens 13 on the optical axis thereof is $R_2m$ with respect to the direction corresponding to the main-scanning direction and $R_2s$ with respect to the sub-scanning direction. The oscillation wavelength of the semiconductor laser is set to be 780 nm and the refractive index of the scanning and imaging lens at this wavelength is assumed to be N.

In the first and second embodiments described below, S=325.6 mm, the effective optical scanning width W=216 mm, and the half field angle α of the scanning and imaging lens 13 is equal to 45.2 degrees.

First embodiment

| i | $R_im$ (mm) | $R_is$ (mm) | $D_i$ (mm) | N |
|---|---|---|---|---|
| 0 | | | 48.0 | |
| 1 | 200.0 | −40.0 | 20.0 | 1.53 |
| 2 | −210.0 | −16.106 | 107.0 | |

The first embodiment concerns the scanning and imaging lens as described in claim 2. Within the plane of deflection, the scanning and imaging lens is configured such that the entrance surface and the exit surface of the scanning and imaging lens are asymmetrical with respect to the optical axis in the direction corresponding to the main-scanning direction. The entrance surface of the scanning and imaging lens is configured as described below on the plane of deflection. the entrance surface: a toric surface radius of curvature on the optical axis within the plane of deflection: $R_1m=200.0$ mm the nonarcuate configuration on that side (+side) of the lens toward the top of FIG. 1:

$K(+)=-37.062$, $A(+)=-2.217E-7$,
$B(+)=2.467E-11$, $C(+)=2.178E-15$,
$D(+)=-3.083E-19$ the nonarcuate configuration on that side (−side) of the lens toward the bottom of FIG. 1:

$K(-)=-41.860$, $A(-)=-2.261E-7$,
$B(-)=2.097E-11$, $C(-)=1.996E-15$,
$D(-)=-1.799E-19$

In the above numerical representation, E and the subsequent numbers indicate a power of 10. For example, E-19 indicates $10^{-19}$. The powers are multiplied by the immediately preceding number. The same rule applies to the description below.

The entrance surface is a toric surface obtained by rotating the above nonarcuate configuration asymmetrical with respect to the optical axis around an axis parallel to the direction corresponding to the main-scanning direction and displaced from the lens surface by 40 mm on the optical axis.

The exit surface of the scanning and imaging lens is configured as described below. the exit surface: special toric surface radius of curvature on the optical axis within the plane of deflection: $R_2m=-40.0$ mm the nonarcuate configuration on that side (+side) of the lens toward the top of FIG. 1:

$K(+)=-3.266$, $A(+)=-4.045E-7$,
$B(+)=2.629E-11$, $C(+)=6.465E-15$,
$D(+)=-1.431E-18$ the nonarcuate configuration on that side (−side) of the lens toward the bottom of FIG. 1:

$K(-)=-2.335$, $A(-)=-4.199E-7$,
$B(-)=1.835E-11$, $C(-)=6.305E-15$,
$D(-)=-1.356E-18$

The radius of curvature $R_2s(Y)$, where Y is a distance from the optical axis in the direction corresponding to the main-scanning direction, of the exit surface within the plane of deflection is given by the following polynomial of high order indicating symmetry with respect to the optical axis:

$$R_2s(Y)=a_0+a_2Y^2+a_4Y^4+a_6Y^6+a_8Y^8+a_{10}Y^{10} \qquad (2)$$

where
$a_0=16.106$, $a_2=-5.551E-4$,
$a_4=6.414E-7$, $a_6=-7.405E-11$,
$a_8=-5.058E-15$, $a_{10}=1.325E-18$ A description will now be given, with reference to FIG. 2, of the configuration of the exit surface.

Figure 2:
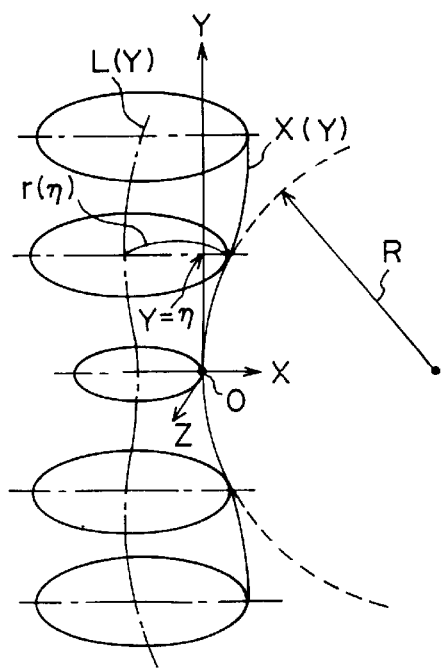
FIG. 2 illustrates a configuration of an exit surface of a scanning and imaging lens according to a first embodiment.

Referring to FIG. 2, the X axis coincides with the optical axis. The Y axis is parallel to the direction corresponding to the main-scanning direction. Accordingly, the X-Y plane is a plane of deflection. The curve X(Y) indicates the configuration of the lens within the plane of deflection. That is, the curve indicates a nonarcuate configuration asymmetrical with respect to the optical axis (X axis). The Z axis is perpendicular to the X-Y plane so that the plane perpendicular to the plane of deflection is parallel to the X-Z plane. The radius of curvature r(Y) of the lens surface within the plane perpendicular to the plane of deflection is $R_2s(Y)$ given by the equation (2) above. The line L(Y) connecting the centers of the circles of curvature is a curve. The surface having such a configuration is referred to as a special toric surface.

Figure 3A:
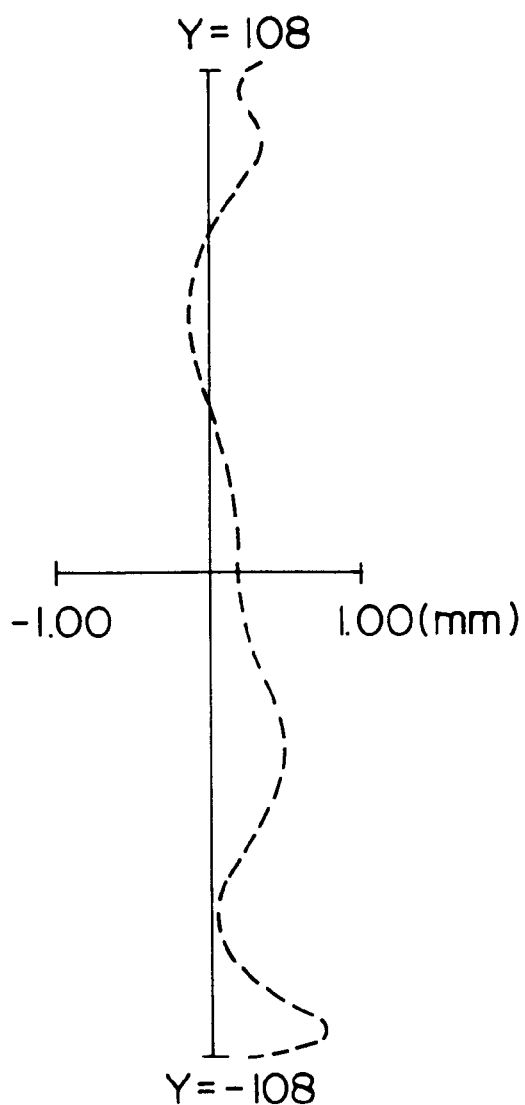
FIG. 3A is a graph showing a field curvature in the main-scanning direction according to the first embodiment.
Figure 3B:
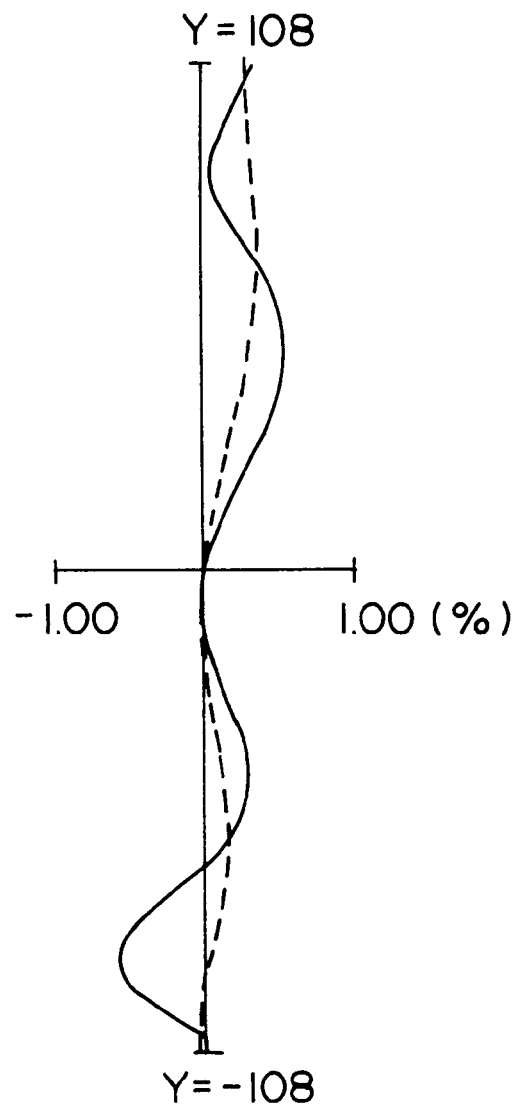
FIG. 3B is a graph showing a constant-velocity characteristic and a linearity according to the first embodiment.

FIG. 3A is a graph showing the field curvature in the direction corresponding to the main scanning direction. FIG. 3B is a graph showing a constant-velocity characteristic and a linearity according to the first embodiment. The constant-velocity characteristic is obtained by modifying fΘ characteristic. Since the deflected beam is slightly convergent with respect to the direction corresponding to the main-scanning direction, the scanning and imaging lens 13 is not precisely an fΘ lens. Referring to FIG. 3B, the broken line indicates the constant-velocity characteristic and the solid line indicates the linearity. The same rule applies to the other graphs as well.

The field curvature in the direction corresponding to the main-scanning direction, the constant-velocity characteristic and the linearity are favorable. This is as a result of configuring the entrance surface and the exit surface within the plane of deflection so as to be asymmetrical in the direction corresponding to the main-scanning direction with respect to the optical axis.

Second embodiment

The second embodiment concerns the scanning and imaging lens as described in claim 3. In the second embodiment, $R_2s(Y)$ of the exit surface is configured to be asymmetrical with respect to the optical axis. Therefore, $R_im$, $R_is$, $D_i$, N and the configuration of the entrance surface and the exit surface within the plane of deflection is the same as the corresponding configuration in the first embodiment.

entrance surface: a toric surface as in the first embodiment
the exit surface:
The configuration of the exit surface within the plane of deflection is the same nonarcuate configuration asymmetrical with respect to the optical axis as the corresponding configuration of the first embodiment.

The radius of curvature $R_2s(Y)$, where Y is a distance from the optical axis, of the exit surface within the plane perpendicular to the plane of deflection is given by the following polynomial of high order:

$$R_2s(Y)=a_0+a_2Y^2+a_4Y^4+a_6Y^6+a_8Y^8+a_{10}Y^{10} \qquad (2)$$

Figure 4:
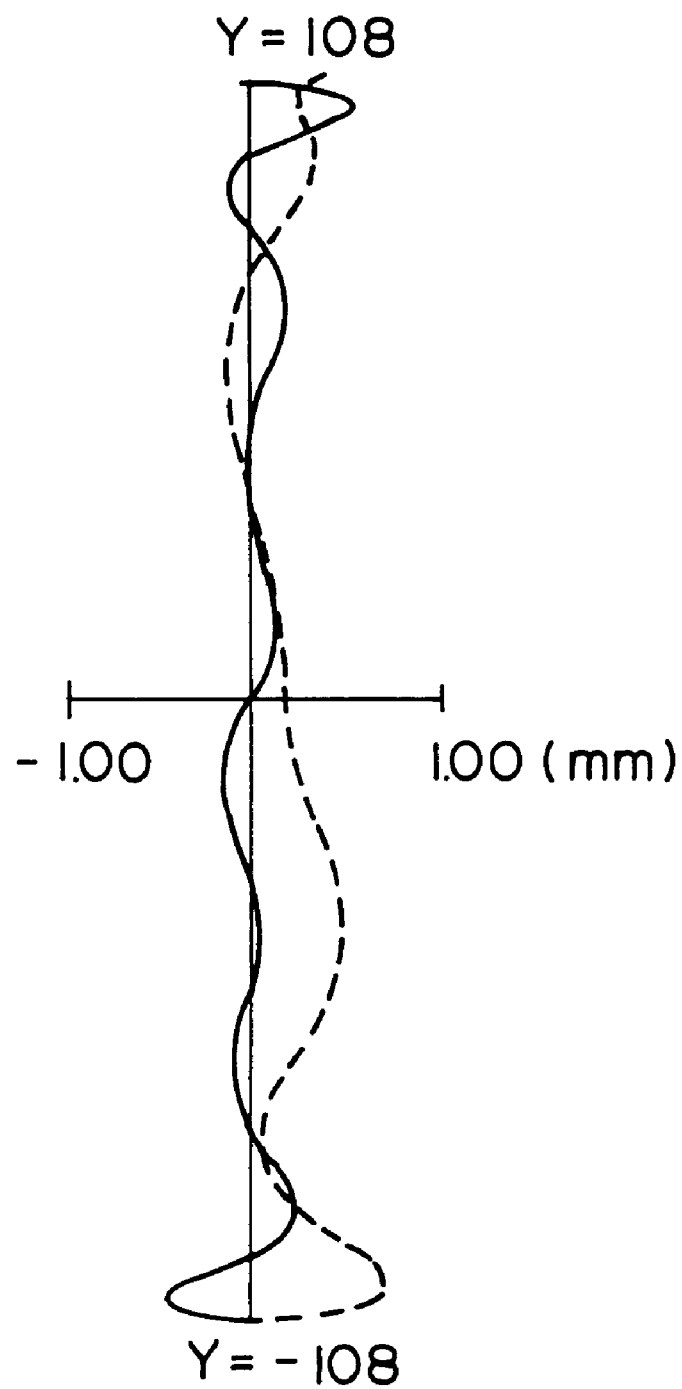
FIG. 4 is a graph showing a field curvature in the main-scanning direction and the sub-scanning direction according the second embodiment.

$R_2s(Y)$ on that (+side) of the lens toward the top of FIG. 1 differs from that on that side (−side) toward the bottom of FIG. 1. That is, $R_2s(Y)$ is asymmetrical with respect to the optical axis. For $R_2s(Y)_+$ on the + side, $a_0(+)=16.106$, $a_2(+)=-2.030E-4$,
$a_4(+)=2.978E-7$, $a_6(+)=1.772E-10$,
$a_8(+)=-9.362E-14$, $a_{10}(+)=1.279E-17$ For $R_2s(Y)$ on the − side, $a_0(-)=16.106$, $a_2(-)=-6.447E-4$,
$a_4(-)=1.007E-6$, $a_6(-)=4.253E-10$,
$a_8(-)=-1.438E-13$, $a_{10}(-)=2.049E-17$ FIG. 4 is a graph showing the field curvature in the direction corresponding to the main-scanning direction and the sub-scanning direction according to the second embodiment. The field curvature (broken line) in the direction corresponding to the main-scanning direction is the same as the field curvature according to the first embodiment. The field curvature (solid line) in the direction corresponding to the sub-scanning direction is also favorable. This is as a result of configuring the polynomial which gives the radius of curvature of the exit surface within the plane perpendicular to the plane of deflection to be asymmetrical with respect to the optical axis, as indicated by $R_2s(Y)_+$ and $R_2s(Y)_-$. The constant-velocity characteristic and the linearity are the same as those provided by the first embodiment.

A description will now be given of a related embodiment.

According to the related embodiment, the entrance surface and the exit surface within the plane of deflection has a nonarcuate configuration symmetrical with respect to the optical axis.

the entrance surface: a toric surface obtained by rotating a nonarcuate configuration symmetrical with respect to the optical axis around an axis parallel to the direction corresponding to the main-scanning direction and displaced from the lens surface by 40 mm on the optical axis, the nonarcuate configuration being determined according to the data given below.

the radius of curvature on the optical axis within the plane of deflection: $R_1m=200.0$ mm, $K=-35.2$, $A=-2.0E-7$, $B=2.2E-11$, $C=1.9E-15$, $D=-1.9E-19$ the exit surface: a toric surface having a nonarcuate configuration symmetrical with respect to the optical axis within the plane of deflection, the nonarcuate configuration being determined according to the data given below.

the radius of curvature on the optical axis within the plane of deflection: $R_2m=-40.0$ mm $K=2.1$, $A=-3.7E-7$, $B=1.7E-11$, $C=-5.9E-15$, $D=1.5E-18$ the radius of curvature $R_2s(Y)$ of the exit surface within the plane perpendicular to the plane of deflection, where Y is a distance from the optical axis is given by the following polynomial of high order indicating symmetry with respect to the optical axis:

$$R_2s(Y) = a_0 + a_2 Y^2 + a_4 Y^4 + a_6 Y^6 + a_8 Y^8 + a_{10} Y^{10} \quad (2)$$

where $a_0=16.106$, $a_2=-5.551E-11$, $a_4=6.414E-7$, $a_6=-7.405E-11$, $a_8=-5.058E-15$, $a_{10}=1.325E-18$ Thus, the scanning and imaging lens as a whole is symmetrical with respect to the optical axis in the direction corresponding to the main-scanning direction.

Figure 6A:
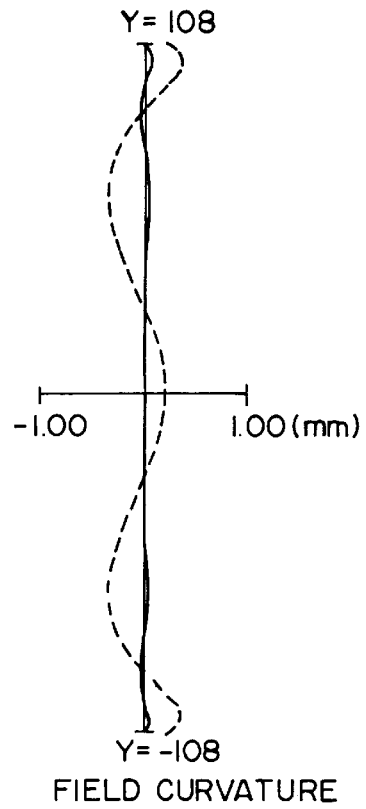
FIG. 6A is a graph showing a field curvature which results when a scanning and imaging lens according to the related embodiment is used in combination with a beam deflector in which a sag is absent.
Figure 6B:
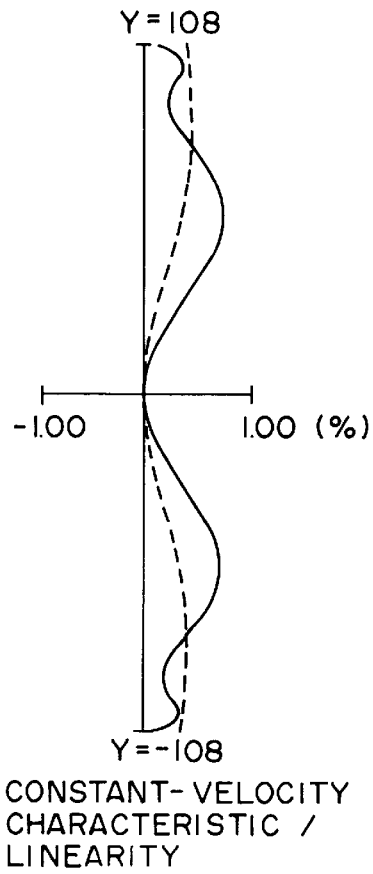
FIG. 6B is a graph showing a constant-velocity characteristic and a linearity which results when the scanning and imaging lens according to the related embodiment is used in combination with the beam deflector in which a sag is absent.

In the case of the related embodiment, no sag occurs if an optical element, such as a rotating single-surface mirror, in which the deflecting and reflecting surface includes the rotation axis of the optical element is used as a beam deflector in place of the polygon mirror 12. As shown in FIGS. 6A and 6B, the scanning and imaging lens of the related embodiment provides a small field curvature in the main-scanning direction (broken line), a small field curvature in the sub-scanning direction, and a proper constant-velocity characteristic and a proper linearity. If the polygon mirror 12 is used as a beam deflector, the sag causes the field curvature in the sub-scanning direction to be degraded as shown in FIG. 5A (solid line). The constant-velocity characteristic and the linearity are also degraded as shown in FIG. 5B.

The scanning and imaging lens according to the first and second embodiments can be produced by molding a plastic (claim 4). A scanning and imaging lens having complex surfaces can be produced with a low cost and high precision by preparing a metal die using a three-dimensional finishing machine.

In the second embodiment, the position at which the line image is formed by the first optical system 11 (the position spaced apart from the deflecting and reflecting surface 12a of the polygon mirror 12) and the scan surface 14 are arranged in a conjugated formation over the effective optical scanning area with respect to the direction corresponding to the sub-scanning direction (claim 6). While the arrangement (claim 5) whereby the deflecting and reflecting surface 12a of the polygon mirror 12 and the scan surface in the conjugated formation over the effective optical scanning area in the direction corresponding to the sub-scanning direction provides a better correction of a facet inclination, the second embodiment whereby the image forming position and the scan surface are arranged in a conjugated formation provides a better correction of the field curvature in the sub-scanning direction. of course, a shift or a tilt in the arrangement may be applied to the scanning and image forming lens according to the second embodiment in order to provide a better correction of the effect of the sag.

A third embodiment described below concerns the scanning and imaging lens as described in claim 8. As shown in FIG. 7, the scanning and imaging lens according to the third embodiment is formed of two lenses. A beam exiting from the first optical system 11 is a parallel beam. The distance S from the natural focal point of the beam in the direction corresponding to the main-scanning direction from the deflecting and reflecting surface 12a is ∞. The polygon mirror 12 of the third embodiment is the same as that of the first and second embodiments.

As shown in FIG. 7, it is assumed that the ith surface of the scanning and imaging lens 15 counting from the side of the deflecting and reflecting surface 12a spaced apart from the i+1th surface thereof by an interval $D_i$ (i=1–3). Further, it is assumed that the image height of the optical spot is 0 (that is, when the deflected beam coincides with the optical axis of the scanning and imaging lens), the distance between the deflecting and reflecting surface 12a and the entrance surface (the surface of the lens 15A facing the deflecting and reflecting surface 12a) of the scanning and imaging lens 15 on the optical axis is $D_0$ (i=0), and the distance between the scan surface 14 and the surface of the lens 15B facing the scan surface 14 is $D_4$ (i=4).

It is assumed that the radius of curvature, on the optical axis, of the ith surface of the scanning and imaging lens 15 counting from the side of the deflecting and reflecting surface 12a is $R_i m$ (radius of curvature on the optical axis within the plane of deflection) in the direction corresponding to the main-scanning direction and $R_i s$ (i=1–4) in the direction corresponding to the sub-scanning direction. Further, it is assumed that the refractive index of the jth lens counting from the side of the deflecting and reflecting surface 12a is $N_j$ (j=1–2) which refractive index corresponds to the oscillation wavelength of the semiconductor laser 10 set to be 780 nm. The effective optical scanning width W=216 mm and the half field angle α of the scanning and imaging lens 15 is equal to 43.6 degrees.

Third embodiment

| i | $R_i m$ (mm) | $R_i s$ (mm) | $D_i$ (mm) | J | $N_j$ |
|---|---|---|---|---|---|
| 0 | | | 40.610 | | |
| 1 | −1247.368 | −400.0 | 10.506 | 1 | 1.537 |
| 2 | −96.361 | −80.0 | 50.235 | | |
| 3 | −1123.687 | (=$R_3m$) | 17.450 | 2 | 1.537 |
| 4 | −164.744 | −29.02 | 97.750 | | |

In the direction corresponding to the main-scanning direction, both the entrance surface and the exit surface of the lens 15A has an asymmetrical configuration with respect to the optical axis within the plane of deflection (claim 8). More specifically, the configuration of the lens 15A within the plane of deflection is specified by the data given below.

the entrance surface of the lens 15A: a toric surface having a nonarcuate configuration asymmetrical with respect to the optical axis within the plane of deflection the radius of curvature on the optical axis within the plane of deflection: $R_1m=-1247.368$ mm, the radius of curvature within the plane perpendicular to the plane of deflection and including the optical axis: $R_1s=-400.00$ mm the nonarcuate configuration on that side (+side) of the lens toward the top of FIG. 7:
$K_1(+)=56.885$, $A_1(+)=-5.426E-7$,
$B_1(+)=2.246E-10$, $C_1(+)=-4.415E-14$,
$D_1(+)=4.670E-18$ the nonarcuate configuration on that side (−side) of the lens toward the bottom of FIG. 7:
$K_1(-)=56.885$, $A_1(-)=-5.415E-7$,
$B_1(-)=2.260E-10$, $C_1(-)=-4.418E-14$,
$D_1(-)=4.669E-18$ the exit surface of the lens 15A: a toric surface having a nonarcuate configuration asymmetrical with respect to the optical axis within the plane of deflection the radius of curvature on the optical axis within the plane of deflection: $R_2m=-96.361$ mm, the radius of curvature within the plane perpendicular to the plane of deflection including the optical axis: $R_2s=-80.00$ mm the nonarcuate configuration on that side (+side) of the lens toward the top of FIG. 7:
$K_2(+)=0.3419$, $A_2(+)=-2.622E-7$,
$B_2(+)=1.311E-11$, $C_2(+)=-1.525E-14$,
$D_2(+)=2.030E-18$ the nonarcuate configuration on that side (−side) of the lens toward the bottom of FIG. 7:
$K_2(-)=0.3419$, $A_2(-)=-2.550E-7$,
$B_2(-)=1.300E-10$, $C_2(-)=1.515E-14$,
$D_2(-)=2.032E-18$ the entrance surface of the lens 15B: a spherical surface the radius of curvature $R_3m$ within the plane of deflection is equal to the radius of curvature $R_3s=-123.687$ mm within the plane perpendicular to the plane of deflection and including the optical axis.

the exit surface of the lens 15B: a special toric surface having the radius of curvature within the plane perpendicular to the plane of deflection varying asymmetrically with respect to the optical axis (claim 10).

the radius of curvature within the plane of deflection: $R_4m=-164.744$ mm, the radius of curvature $R_4s(Y)$ within the plane perpendicular to the plane of deflection, where Y is a distance from the optical axis in the direction corresponding to the main-scanning direction, is given by the following polynomial of high order:

$$R_4s(Y)=a_0+a_2Y^2+a_4Y^4+a_6Y^6+a_8Y^8+a_{10}Y^{10} \qquad (2)$$

Figure 8A:
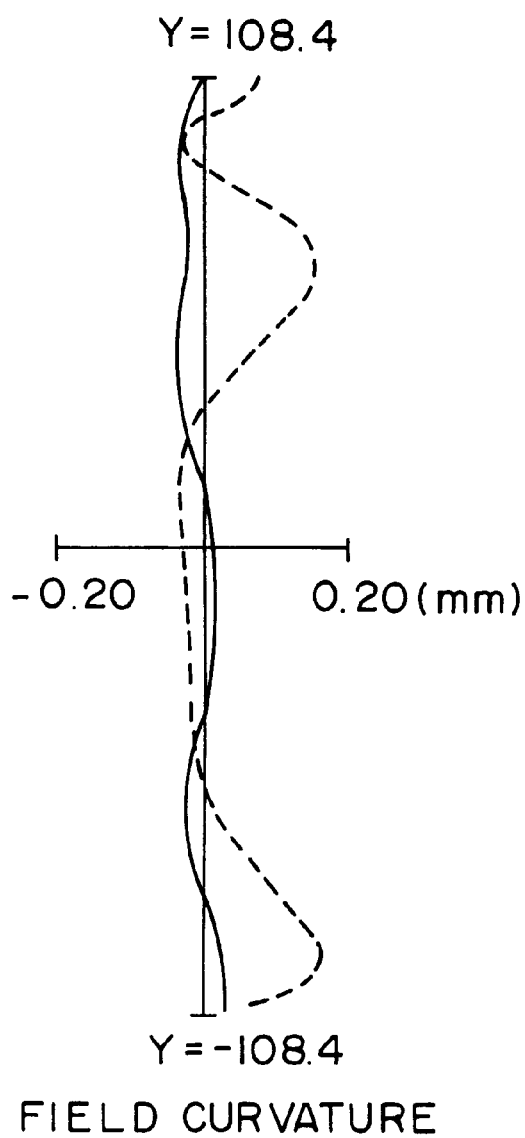
FIG. 8A is a graph showing a field curvature in the main-scanning direction according to a third embodiment.
Figure 8B:
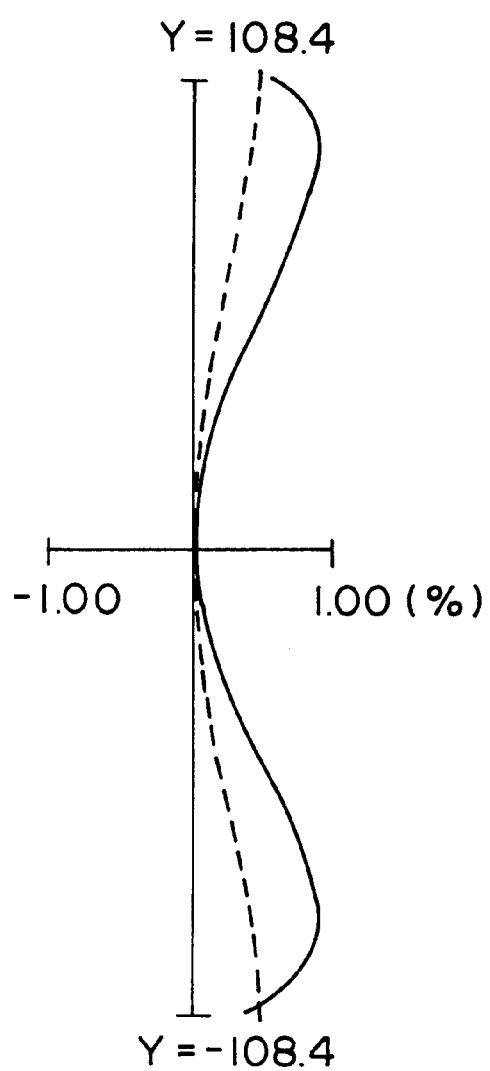
FIG. 8B is a graph showing a constant-velocity characteristic and a linearity according to the third embodiment.

For $R_4s(Y)_+$ on the + side toward the top of FIG. 7,
$a_0(+)=-29.02$, $a_2(+)=-0.4163E-3$,
$a_4(+)=0.3040E-8$, $a_6(+)=0.8338E-11$,
$a_8(+)=-0.1608E-14$, $a_{10}(+)=0.9851E-19$ For $R_4s(Y)_-$ on the − side toward the bottom of FIG. 7,
$a_0(-)=-29.02$, $a_2(-)=-0.4466E-3$,
$a_4(-)=0.2976E-7$, $a_6(-)=-0.6806E-11$,
$a_8(-)=0.1549E-14$, $a_{10}(-)=-0.1219E-18$ FIG. 8A is a graph showing the field curvature in the direction corresponding to the main-scanning direction (broken line) and the sub-scanning direction (solid line) according to the third embodiment. FIG. 8B is a graph showing the constant-velocity characteristic (broken line) and the linearity (solid line). Since the beam exiting the first optical system 11 is a parallel beam in the direction corresponding to the main-scanning direction, the constant-velocity characteristic is an fΘ characteristic. The field curvature in the direction corresponding to the main-scanning direction, the constant-field characteristic (fΘ characteristic), and the linearity are favorable. This is as a result of configuring the entrance surface and the exit surface of the lens 15A within the plane of deflection so as to be asymmetrical with respect to the optical axis in the direction corresponding to the main-scanning direction.

It will be noted that the field curvature in the sub-scanning direction (solid line) is properly corrected. This is as a result of configuring the polynomial which gives the radius of curvature of the exit surface of the lens 15B within the plane perpendicular to the plane of deflection to be asymmetrical with respect to the optical axis, as indicated by $R_4s(Y)_+$ and $R_4s(Y)_-$.

While the description above pertaining to the invention as described in claim 8 assumes that two lenses form the scanning and imaging lens. It is of course possible to form the scanning and imaging lens of three or more lenses.

Briefly reviewing, the present invention provides a novel scanning and imaging lens and an optical scanning device. According to the present invention, the unfavorable effect of a so-called sag caused by using a polygon mirror as a beam deflector in an optical scanning device can be effectively reduced and removed.

According to the invention as described in claim 4, a scanning and imaging lens having precisely finished surfaces can be produced at a low cost. According to the invention as described in claim 5, a facet inclination in a polygon mirror can be properly corrected. According to the invention as described in claim 6, the field curvature of in the sub-scanning direction can be properly corrected.

According to the invention as described in claim 8, the performance can be improved by forming the scanning and imaging lens of a plurality of lenses. According to the invention as described in claim 12, a scanning and imaging lens having precisely finished surfaces can be produced at a low cost. According to the invention as described in claim 13, a facet inclination in a polygon mirror can be properly corrected. According to the invention as described in claim 14, the field curvature in the sub-scanning direction can be properly corrected. Since the scanning and imaging lens according to claim 8 may be formed of two or more lenses, a large degree of flexibility is provided in terms of determining which lens surface is to have an asymmetrical configuration (claim 10) within the plane of deflection, and determining which lens surface has an asymmetrical variation, with respect to the optical axis, in the radius of curvature within the plane of deflection. Accordingly, ease of the design results.

The present invention is not limited to the above described embodiments, and variations and modifications may be made without departing from the scope of the present invention.

What is claimed is:

1. An optical scanning lens comprising a single lens;
said single lens comprising an optical axis, a first lens surface and a second lens surface, at least one of said first and second lens surfaces having a configuration within a plane of deflection, the configuration being asymmetrical with respect to an optical axis, the asymmetrical configuration with respect to the optical axis being designed so that a field curvature is properly corrected and a proper constant-velocity characteristic is obtained over an entire effective optical scanning area, and the plane of deflection being defined as a plane including the optical axis and parallel to a direction corresponding to a main-scanning direction, said optical scanning lens provided in an optical scanning device in which a light beam forming a line image elongated in the direction corresponding to the main-scanning direction is deflected at a constant angular velocity by a deflector having a reflecting surface in a vicinity of a position of the line image, and in which a deflected beam is focused by the optical scanning lens to form a beam spot on a surface to be scanned so as to scan the surface to be scanned, wherein a radius of curvature of at least one of said first and second lens surfaces within a plane perpendicular to the plane of deflection is denoted by a polynomial of high order $\Sigma a_n \cdot Y^{**}n$ (n=0, 1, 2, 3 . . . ) where Y denotes a distance from the optical axis in the direction corresponding to the main-scanning direction, $a_n$ denotes a coefficient of the nth order term of the polynomial, and configurations provided by the polynomial are asymmetrical with respect to the optical axis.

2. The optical scanning lens as claimed in claim 1, wherein at least one of said first and second lens surfaces of the optical scanning lens has a nonarcuate configuration asymmetrical with respect to the optical axis within the plane of deflection.

3. The optical scanning lens as claimed in claim 1, wherein the optical scanning lens is formed by molding a plastic.

4. The optical scanning lens as claimed in claim 1, wherein the relationship between the reflecting surface of the deflector and the surface to be scanned is geometrically optically conjugate over the entire effective optical scanning area in a direction corresponding to the sub-scanning direction.

5. The optical scanning lens as claimed in claimed in claim 1, wherein the relationship between the position of the line image and the surface to be scanned is geometrically optically over the entire optical scanning area in the direction corresponding to the sub-scanning direction.

6. An optical scanning device comprising:

a light source for emitting a beam;

a deflector for deflecting the beam from said light source at a constant angular velocity;

an optical system for coupling the beam from said light source, the coupled beam forming a line image elongated in a direction corresponding to a main scanning direction in proximity to a reflecting surface of said deflector; and an optical scanning lens for converging the deflected beam to a beam spot on a surface to be scanned so as to scan said surface to be scanned at a constant velocity;

said optical scanning lens comprising a single lens;

said single lens comprising an optical axis, a first lens surface and a second lens surface, at least one of said first and second lens surfaces having a configuration within a plane of deflection, the configuration being asynmmetrical with respect to an optical axis, the asymmetrical configuration with respect to the optical axis being designed so that a field curvature is properly corrected and a proper constant-velocity characteristic is obtained over an entire effective optical scanning area, and the plane of deflection being defined as a plane including the optical axis and parallel to a direction corresponding to a main-scanning direction, wherein a radius of curvature of at least one of said first and second lens surfaces within a plane perpendicular to the plane of deflection is denoted by a polynomial of high order $\Sigma a_n \cdot Y^{**}n$ (n=0, 1, 2, 3 . . . ) where Y denotes a distance from the optical axis in the direction corresponding to the main-scanning direction, $a_n$ denotes a coefficient of the nth order term of the polynomial, and configurations provided by the polynomial are asymmetrical with respect to the optical axis.

7. An optical scanning device comprising:

a light source for emitting a beam;

a deflector for deflecting the beam from said light source at a constant angular velocity;

an optical coupling lens for coupling the beam from said light source;

an optical forming lens for forming the coupled beam into a line image elongated in a direction corresponding to a main scanning direction in proximity to a reflecting surface of said beam deflector; and an optical scanning lens for converging the deflected beam to a beam spot on a surface to be scanned so as to scan said surface to be scanned at a constant velocity;

said optical scanning lens comprising a single lens;

said single lens comprising an optical axis, a first lens surface and a second lens surface, at least one of said first and second lens surfaces having a configuration within a plane of deflection, the configuration being asymmetrical with respect to an optical axis, the asymmetrical configuration with respect to the optical axis being designed so that a field curvature is properly corrected and a proper constant-velocity characteristic is obtained over an entire effective optical scanning area, and the plane of deflection being defined as a plane including the optical axis and parallel to a direction corresponding to a main-scanning direction, wherein a radius of curvature of at least one of said first and second lens surfaces within a plane perpendicular to the plane of deflection is denoted by a polynomial of high order $\Sigma a_n \cdot Y^{**}n$ (n=0, 1, 2, 3 . . . ) where Y denotes a distance from the optical axis in the direction corresponding to the main-scanning direction, $a_n$ denotes a coefficient of the nth order term of the polynomial, and configurations provided by the polynomial are asymmetrical with respect to the optical axis.

8. An image forming device having an optical scanning device and for forming an image on a photosensitive medium, comprising:

optical scanning lens comprising a single lens;

said single lens comprising an optical axis, a first lens surface and a second lens surface, at least one of said first and second lens surfaces having a configuration within a plane of deflection, the configuration being asymmetrical with respect to an optical axis, the asymmetrical configuration with respect to the optical axis being designed so that a field curvature is properly corrected and a proper constant-velocity characteristic is obtained over an entire effective optical scanning area, and the plane of deflection being defined as a plane including the optical axis and parallel to a direction corresponding to a main-scanning direction, said optical scanning lens provided in said optical scanning device in which a light beam forming a line image elongated in the direction corresponding to the main-scanning direction is deflected at a constant angular velocity by a deflector having a reflecting surface in a vicinity of a position of the line image, and in which a deflected beam is focused by the optical scanning lens to form a beam spot on a surface to be scanned so as to scan the surface to be scanned, wherein a radius of curvature of at least one of said first and second lens surfaces within a plane perpendicular to the plane of deflection is denoted by a polynomial of high order $\Sigma a_n \cdot Y^{**}n$ ($n = 0, 1, 2, 3 \ldots$) where Y denotes a distance from the optical axis in the direction corresponding to the main-scanning direction, $a_n$ denotes a coefficient of the nth order term of the polynomial, and configurations provided by the polynomial are asymmetrical with respect to the optical axis.

* * * * *